July 21, 1970 P. ANGELLE 3,521,283

TELEMETRIC STATION

Filed Feb. 19, 1968

United States Patent Office 3,521,283
Patented July 21, 1970

3,521,283
TELEMETRIC STATION
Philippe Angelle, Nantes, France, assignor to Societe d'Etudes et Constructions Electroniques (Sercel), Montrouge, France, a corporation of France
Filed Feb. 19, 1968, Ser. No. 706,602
Claims priority, application France, Mar. 1, 1967, 96,930
Int. Cl. G01s 9/23
U.S. Cl. 343—14                                       5 Claims

ABSTRACT OF THE DISCLOSURE

A method for cutting out the initial value of the phase in telemeters of the type disclosed in U.S. Pat. 3,360,797 consisting in measuring a substantially zero distance upon insertion of a reflector between the transmitter and the receiver, performing a first sweep in frequency and executing a preliminary measurement with the fast indicator on a remote target before the return sweep is performed. The indicator means are also improved by causing photo-cells to be subjected to illuminating pulses produced by the notches provided at the periphery of a disc driven by the phase-measuring means at the receiver end.

---

U.S. Pat. 3,360,797 discloses an electromagnetic telemeter producing both a fine and a rough measurement of a distance, the rough measurement being obtained by causing the frequency of modulation of the carrier wave to vary between predetermined limits defining a sweep in frequency. In order to make the measurements easier, the telemeter described in said prior specification incorporated indicating measur including two hands serving for fine and rough measurements respectively, the hand used for rough measurement being adapted to be shifted by hand so that it may be returned to zero at the beginning of the sweep in frequency. Such an arrangement, which is quite elaborate, requires a comparatively intricate operation since it is necessary to cut out the initial value of the phase, which initial value appears in the formula binding the distance to the phase shift $\varphi$ and varies in particular with the value of the frequency of modulation.

In other words, in a telemeter of the type considered, the distance to be measured D is bound to the phase-shift by the following equation $$\phi = 2\pi F \frac{2D}{c} + \varphi \qquad (1)$$

where $\pi = 3.1416$ while F designates the modulation frequency, c the speed of propagation of the waves and $\varphi$ the initial phase shift, the value of which depends on F. Said phase-shift depends also on the temperature of the telemeter during execution of the measurement since the temperature modifies the values of internal phase shifts occurring in the amplifiers, mixers and the like.

The present invention has chiefly for its object a method which allows elimination more readily of the influence of the initial phase shift.

The invention also contemplates a purely electronic embodiment of the distance indicating means which operate automatically in accordance with said improved method.

A known improvement consists in the possibility of adjusting the telemeter by executing a measurement when the distance to be measured is reduced to zero, said result being obtained by inserting between the telemeter glass at the transmission end and the telemeter glass at the reception end a reflector returning into the latter an extremely small fraction of the visible or non-visible light radiated by the glass at the transmission end, whereby it is possible to adjust the telemetric arrangement for a zero range, the setting of said reflector in an operative or inoperative position being controlled by an electromagnet.

The method referred to hereinabove and devised for such an arrangement will now be described in its application to the telemeter disclosed in the above-mentioned prior patent and incorporating two hands.

According to the present invention, the method of eliminating the influence of $\varphi$ is as follows:

(1) The reflector is set in its operative position, the modulation frequency being equal to F2, assuming the sweep in frequency extends between F2 and F1, while the hands are returned to zero.

(2) The sweep in frequency is then executed, the frequency of modulation F varying between the values F2 and F1 which leads to a rotation of the longer or minute hand by an agle $\alpha$ such that $\alpha = \varphi_1 - \varphi_2$.

This is the direct consequence of the Equation 1 since D is then equal to zero, $\varphi_1$ being the value of $\varphi$ for $F = F1$ and $\varphi_2$ its values for $F = F2$.

(3) This being done, the connection between the shorter or hour hand and the control mechanism is eliminated, the frequency of modulation remaining then equal to F1.

(4) The reflector is returned to its inoperative condition while the frequency F remains equal to F1, so that the minute hand rotates now under the action of the control mechanism through an angle $$\beta = 2\pi F_1 \frac{2D}{c}$$

with reference to the position occupied by it at the end of step (2) or frequency sweep step.

(5) The minute hand stabilized, the connection between the hour hand and the control mechanism is restored, after which a sweep in frequency is executed in the reverse direction, the frequency of modulation returning then from the value F1 to the value F2.

During said sweep in frequency, both hands—move again and by reason of the double sweep performed in opposite directions, the value ($\varphi_1 - \varphi_2$) disappears so that the fine measurement obtained is equal to $$\beta' = 2\pi F_2 \frac{2D}{c}$$

The same is the case for the rough measurement provided by the hour hand $$\frac{2\pi}{10}(F2 - F1)\frac{2D}{c}$$

assuming that $$\frac{F2 - F1}{F1} = \frac{1}{10}$$

A modified embodiment of the telemetric station designed for the execution of the above operation will now be described, the hands being replaced in this case by electronic counters showing the numerical value of the distance to be measured.

The telemetric station is substantially the same as that described in the above-mentioned prior patent. It includes in particular, as disclosed in said patent, an arrangement similar to that illustrated at 7 in said patent and including a rotary phase-shifter controlled by a motor in accordance with a well-known system. Said arrangement is shown in FIG. 1 of the accompanying drawings. The output voltage of the phase comparator controls the D.C. motor 1 the shaft of which is rigid with a pinion 2 and a disc 3. The pinion 2 meshes with another pinion 4 keyed to the shaft of the rotary phase-shifter 5 inserted in one of the two wires feeding the phase comparator.

The speed-reducing ratio provided by the gears 2–4 is preferably equal to the value of $$\frac{F2 - F1}{F1}$$

which may be equal to 10 for instance. The arrangement operates in a well-known manner so that when conditions of equilibrium are obtained, the motor has caused its shaft to rotate through an angle such that the phase shift produced by the phase shifter 5 has cut out the phase-shift appearing between the voltages applied to the phase comparator; the angular position assumed by the disc 3 forms thus a measurement of the phase shift.

In the above-mentioned prior patent the hour hand providing a rough measurement is driven by a gearing, the speed-reducing ratio of which is equal to $\frac{1}{10}$ with reference to the shaft of the phase shifter while a hand keyed to the last-mentioned shaft supplies the fine measurement.

In the case of the present invention, no indicating hands are used and the periphery of the disc is provided with transverse notches separated from each other by teeth the breadth of which is equal to that of the notches.

In the accompanying drawings illustrating the invention:

Figure 2:
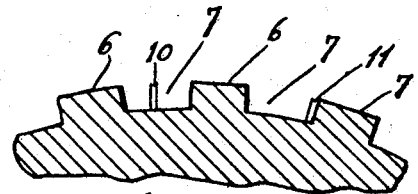
FIG. 2 is an elevational view of a part of the disc shown in said diagram.

In FIG. 2, the breadth of the notches and teeth has been purposely exaggerated for sake of clarity of the disclosure, 6 designating the teeth and 7 the notches. In practice, it is preferable to resort to a disc with 50 notches so as to obtain 100 pulses.

Figure 1:
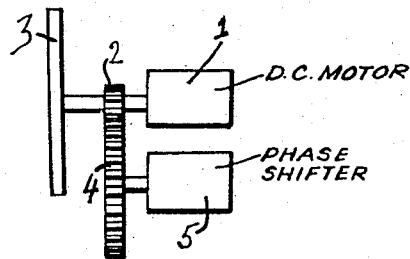
FIG. 1 is an explanatory diagram as already described.
Figure 3:
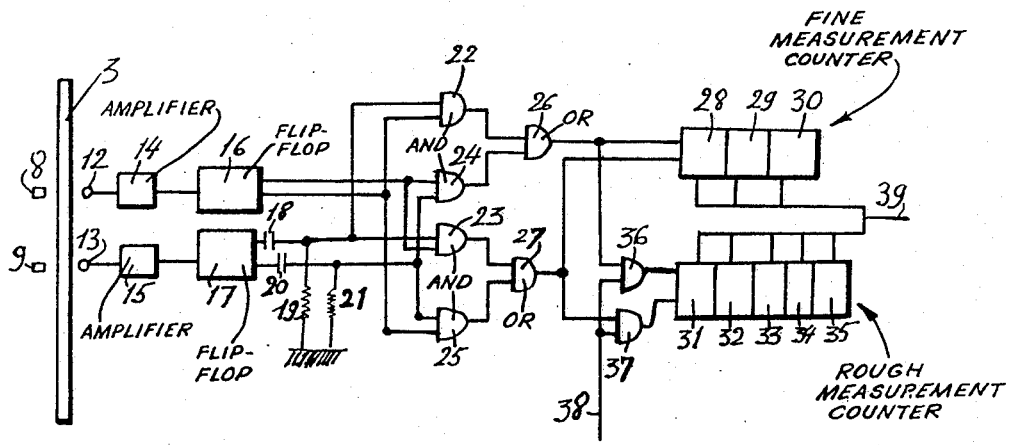
FIG. 3 is a general wiring diagram according to my invention.

According to the invention said notches serve for defining the angular setting of the disc 3 in association with luminous beams passing through them, together with logical members and pulse counters. The wiring diagram illustrated is illustrated in FIG. 3 in which the disc 3 of FIGS. 1 and 2 is drawn again with its periphery facing the bulbs 8 and 9 illuminating the fine slots 10 and 11 shown in FIG. 2. Said slots are adapted to register with the notches in the disc and to be closed against light by the teeth when the latter register with them. The luminous beams which have passed through the slots 10 and 11 impinge on the photo-cells 12 and 13 which feed then the amplifiers 14 and 15 controlling the flip-flops 16 and 17.

As illustrated, the flip-flop 16 is provided with two outputs. For one condition of the flip-flop, the voltage on one of its outputs is equal to V and that on the other is equal to zero and this distribution of voltage is reversed when the condition of the flip-flop is reversed. The same is the case for the flip-flop 17 which is also provided with two outputs.

The voltages of the two outputs of the flip-flop 17 are differentiated by the resistance and capacity cells 18–19 and 20–21 so that there is obtained at the connecting points between 18 and 19 on the one hand and between 20 and 21 on the other hand a pulse each time the photocell 13 passes out of its illuminated condition into its non-illuminated condition and reversely. The connecting point between 18 and 19 feeds one of the inputs of each of the logical members 22 and 23, while the connecting point between 20 and 21 feeds one of the inputs of each of two other logical members 24 and 25. The other inputs of the logical members 22 and 25 are connected with one of the outputs of the flip-flop 16.

The other inputs of the members 23 and 24 are connected with the other output of said flip-flop 16. The four logical members 22 to 25 are of the AND type.

Consequently, when the flip-flop 16 is in one of its allow the pulses from the other flip-flop 17 to pass or else the logical members 22 and 25 allow the pulses from the other flip-flop 17 to pass or else the logical members 23 and 25 allow said passage.

In other words, a positive pulse from the flip-flop 17 transmitted by the capacity cell 18 is transmitted through the member 22 when the other flip-flop 16 is in one of its conditions and through the member 23 when the latter is in its other condition. The operation is similar for the pulses transmitted through the capacity cell 20.

The voltages passing out of the members 22 and 24 feed the input of a further logical member 26 and similarly the voltages passing out of the members 23 and 25 feed the input of a further logical member 27.

Said further logical members are of the OR type and their outputs feed in parallel both the fine measurement and the rough measurement counters which are both of the forward and backward type. The fine measurement counter includes three decades 28, 29, 30.

The pulses fed by the member 26 actuate the counters in the forward direction, while the pulses fed by the member 27 actuate the counters in the reverse direction.

The output voltages of the members 26 and 27 feed also the rough measurement counter including five decades 31, 32, 33, 34 and 35 of which only the last three serve for displaying the result, since the two first decades form a mere duplication of the fine measurement counter.

Furthermore, between the input of the decade 31 and the outputs of the members 26 and 27, there are inserted two logical members 36 and 37 of the AND type. These members 36 and 37 afford a passage for the pulses fed by the members 26 and 27 only if a predetermined voltage is applied to their further inputs connected in parallel with a lead 38, whereby it is possible to cut out or to allow operation of the rough measurement counter as desired by applying a suitable voltage to said lead 38.

Lastly, connections with an auxiliary lead 39 allow returning to zero the eight decades formed by the two counters.

The duplication of the sequential parts 8–12–14–16 has for its object to ascertain the actual direction of rotation of the motor, the pulses corresponding to one direction of rotation providing the actual counting and those corresponding to the opposite direction of rotation providing a reverse or backward counting.

To this end, the slots 10 and 11 are shifted with reference to each other by a predetermined angle with reference to the breadth of a notch in the disc equal for instance to one quarter of the pitch between two successive teeth. It is readily apparent that this allows the direction of rotation of the disc to cause the pulses transmitted through the capacities 18 or 20 to pass through the logical members 26 or 27 according to the slot 10 or 11 which transmits light.

Preferably, a programmer controls automatically the operation in conformity with the modus operandi disclosed hereinabove. Said operations are as follows:

The light being modulated at the frequency F2, the reflector is set in its operative position and the forward and backward counting means are returned to zero. This being done, a voltage is applied on the lead 38, the value of which is such that the logical members 36 and 37 allow the pulses to pass through them.

The sweep of frequency is then executed between F2 and F1, which corresponds to the transmission of pulses to both counters. The lead 38 is then fed with a voltage such as will ensure the cutting out of the rough measurement counter after which the reflector is returned into its inoperative condition so that the pulses now feed the fine measurement counter alone. This being done, connection is restored with the rough measurement counter, while the frequency of modulation is returned from F1 to F2. The final result is then shown accurately by both counters, the influence of $\varphi$ being eliminated.

What I claim is:

1. A method for operating a telemetric station comprising a transmitter adapted to produce a modulated wave to be reflected by a remote point the distance of which is to be measured and including means slowly modifying the frequency of modulation of the transmitted waves between two predetermined limits, a receiver adapted to receive the reflected modulated waves and including means measuring the phase shift between signals derived from the transmitted and reflected waves and two indicators controlled by the means measuring the phase shift and operating at different speeds, the slower indicator being adapted to normally indicate over less than one revolution a rough non-ambiguous value of the phase shift and the faster indicator providing a fine measurement of the phase shift, said method comprising positioning a reflector between the transmitter and the receiver to measure a substantially zero distance, executing a sweep in frequency to provide a measurement at said zero distance, cutting off the connection between the rough measurement indicator and the receiver, returning the reflector into an inoperative condition, executing a first measurement on a remote target with the fine measurement indicator, restoring the connection with the rough measurement indicator and executing a sweep in frequency returning the frequency to its starting value to obtain on the indicator the actual value of the distance of the remote target independently of the initial phases.

2. In a telemetric station comprising a transmitter adapted to produce a modulated wave to be reflected by a remote point the distance of which is to be measured and including means slowly modifying the frequency of modulation of the transmitted waves between two predetermined limits, a receiver adapted to receive the reflected modulated wave and including means measuring the phase shift between signals derived from the transmitted and reflected waves, the provision of indicating means comprising a disc controlled by the means measuring the phase shift and provided along its periphery with uniformly distributed notches separated by projecting teeth, a source of at least one narrow pencil of light adapted to pass through successive notches and to be arrested by the teeth of the disc, photo-diodes collecting the corresponding pencils of light passing through the notches in the disc, a circuit system fed by the photo-diodes and two electronic indicators controlled by said circuit system and operating at different speeds to provide respectively fine and rough distance measurements.

3. A telemetric station as claimed in claim 2, wherein two photo-diodes feed the circuit system and the circuit system includes an amplifier fed by each photo-diode, a flip-flop fed by each amplifier and having two outputs, two pairs of logical AND members fed respectively by the outputs of one flip-flop in alternation, means differentiating the outputs of the other flip-flop and connecting them respectively with one logical member of each pair and two further logical OR members inserted each between logical members of both pairs controlled by different outputs of said other flip-flop and the corresponding indicator.

4. A telemetric station as claimed in claim 2, wherein two photo-diodes feed the circuit system and the circuit system includes an amplifier fed by each photo-diode, a flip-flop fed by each amplifier and having two outputs, two pairs of logical AND members fed respectively by the outputs of one flip-flop in alternation, means differentiating the outputs of the other flip-flop and connecting them respectively with one logical member of each pair and two further logical OR members inserted each between logical members of both pairs controlled by different outputs of said other flip-flop and the corresponding indicator and means adapted to control selectively the operation of said two indicators.

5. A telemetric station as claimed in claim 2, comprising a programmer controlling the operation of the transmitter and receiver.

References Cited

UNITED STATES PATENTS

| | | | |
|---|---|---|---|
| 2,524,807 | 10/1950 | Kallmann | 356—4 |
| 2,909,958 | 10/1959 | Hildebrand | 356—5 |
| 3,113,309 | 12/1963 | Kuecken | 343—14 |
| 3,164,661 | 1/1965 | Dellon | 456—5 |
| 3,223,998 | 12/1965 | Hose | 343—12 |
| 3,248,729 | 4/1966 | Howard et al. | 343—12 |
| 3,300,780 | 1/1967 | Mason | 343—12 |
| 3,307,192 | 2/1967 | Attwood | 343—12 XR |
| 3,366,954 | 1/1968 | Stahler | 343—12 |

RICHARD A. FARLEY, Primary Examiner

J. P. MORRIS, Assistant Examiner

U.S. Cl. X.R.

356—5